May 6, 1958    HANS-JOACHIM M. FÖRSTER    2,833,162
FLUID-OPERATED GEAR SHIFT MECHANISM, PARTICULARLY
FOR MOTOR VEHICLES
Filed Nov. 12, 1952                                          2 Sheets-Sheet 1

Inventor
HANS-JOACHIM M. FÖRSTER
By: Dicke and Padlon
ATTORNEYS

Fig. 4

United States Patent Office 2,833,162
Patented May 6, 1958

2,833,162

FLUID-OPERATED GEAR SHIFT MECHANISM, PARTICULARLY FOR MOTOR VEHICLES

Hans-Joachim M. Förster, Stuttgart-Bad Cannstatt, Germany, assignor to Daimler-Benz Aktiengesellschaft, Stuttgart-Unterturkheim, Germany Application November 12, 1952, Serial No. 320,032

Claims priority, application Germany November 16, 1951

26 Claims. (Cl. 74—732)

My invention relates to a fluid-operated gear shift mechanism, particularly for motor vehicles, and is primarily applicable to the transmission described in my co-pending application Serial No. 245,131 filed on September 5, 1951, and relating to a Speed Change Transmission for Motor Vehicles in which gears are selected for operation by the engagement of friction clutches in dependence on the vacuum existing in the intake manifold of the engine of the motor vehicle.

It is the object of my present invention to improve and simply the control system described in my co-pending application and, more especially, to improve means whereby the fluid pressure causing engagement of the friction clutches of the gears is controlled in proportion to the driving torque to be transferred from the engine to the wheels of the vehicle thus ensuring a smooth and flexible change from one speed to another. It is a more specific object of my invention to so control the clutch-actuating fluid pressure as to ensure a predetermined substantially constant surplus of such pressure over the limit required to prevent slippage of the engaged friction clutch.

Further objects of my invention are to prevent the fluid pressure acting on an engaged friction clutch from being adversely affected, when another friction clutch is to be engaged, by the admission of fluid under pressure to the means actuating such other clutch; to provide a safeguard against the inadvertent or accidental engagement of a clutch for a certain speed coincidentally to the admission of fluid under pressure to another friction clutch for a higher speed; to so control the pressure of the fluid in dependence on the vacuum existing in the intake manifold of the engine of a motor vehicle as to ensure that the engine, when its throttle is fully closed causing the engine to exert a maximum braking couple on the driven shaft geared to the wheels of the vehicle, will be disconnected from said driven shaft; to provide means which will prevent the pressure fluid from engaging the clutch for the highest vehicle speed unless the speed of the vehicle surpasses a certain limit, even should the driver shift the gear shift lever to the highest speed position; to provide improved means for the alternative connection to the fluid control system of a primary pump geared to the driving shaft of the transmission, or of a secondary pump geared to the driven shaft of the transmission; and to provide an improved reverse valve put in operation when the transmission is to be shifted to reverse and adapted to cause the temporary and transitional simultaneous engagement of two forward-speed clutches for the purpose of stopping the gears prior to the shifting motion of the reverse gear.

A preferred embodiment of my invention is shown in the accompanying drawing by way of example as applied to the transmission disclosed in my co-pending application above referred to. It is to be clearly understood, however, that the detailed explanation following hereinafter with reference to the drawing serves the purpose of illustration of the invention rather than that of limitation of the scope thereof.

Figures 1, 2:
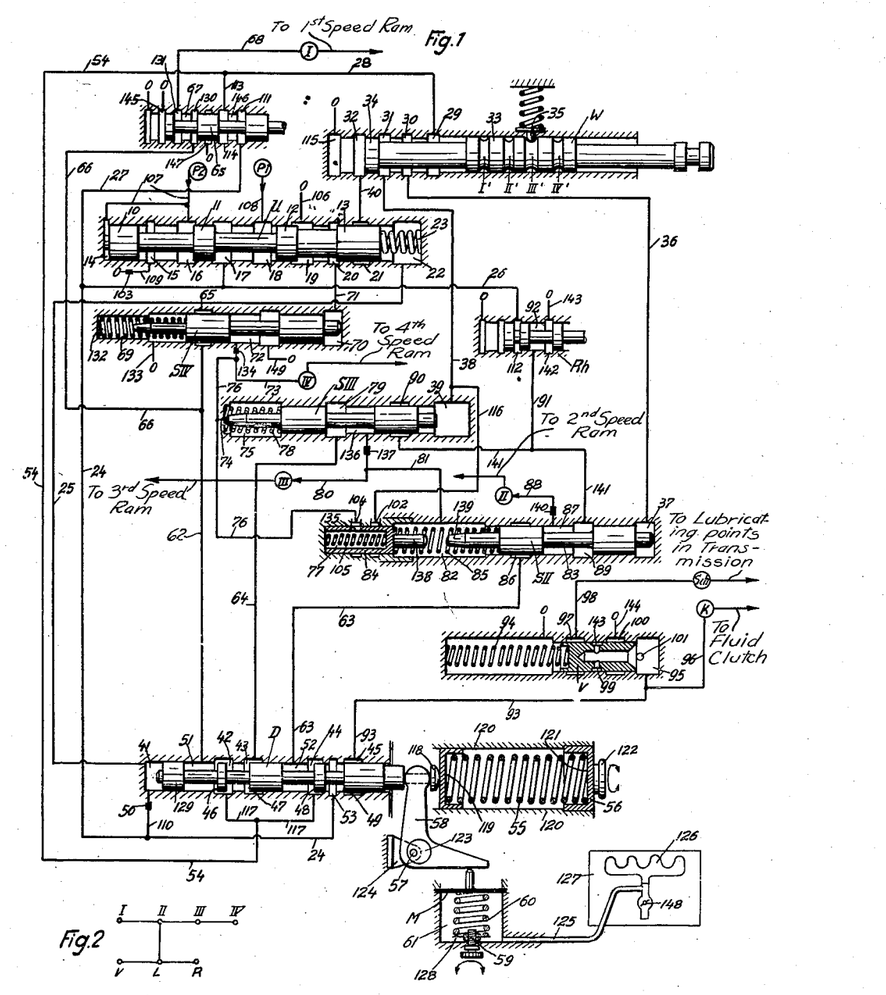
Fig. 1 shows a plurality of valves of the slidable piston type, some of which are similar to those shown and described in my co-pending application, and the bores or cavities of the valve housing and the interconnecting fluid ducts in a more or less diagrammatic fashion, such ducts being indicated by full lines for sake of clarity.
Fig. 2 is a diagrammatic representation of the various possible positions of the gear shift lever mounted on the steering column of the vehicle.
Figure 3:
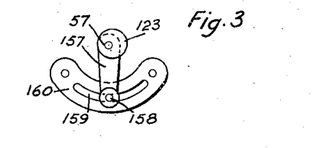
Figure 3 is a front view of the adjusting mechanism for the eccentrically mounted crank lever 58.

A detailed description of the common valve housing provided with the cavities or bores or ducts shown in Fig. 1 is deemed dispensable herewith since the housing is similar to the valve housing shown and described in Figs. 14 to 18 of my co-pending application and designated by the reference numeral 64 therein.

In the drawing:

P1 is a primary pump geared to the driving shaft of the transmission;

P2 is a secondary pump geared to the driven or outgoing shaft of the transmission;

U is a shifting valve;

D is a pressure control valve;

Gs is a plane shifting valve so connected with the orthodox gear shift lever mounted on the steering column of the vehicle as to be moved thereby from the left to the right when the gear shift lever is shifted from its upper plane of movement including the positions I, II, III and IV to its lower plane of movement comprising the positions V, L, R or vice versa;

W is a ratio selector;

Rh is a reverse valve which functions to facilitate the shifting of the transmission into reverse;

K indicates the fluid clutch described in the co-pending application; and

Sch denotes a conduit leading to the lubricating points of the transmission.

Each of the elements listed hereinabove corresponds to the element denoted by the same reference chracters in my co-pending application. Therefore, reference may be had thereto for a detailed description showing how the valves W and Gs are connected to the gear shift lever to be set thereby.

In addition I have provided the following valves encased in suitable bores of the valve housing:

SII, SIII and SIV, same being gear shift control valves for the second, third and fourth speed;

V is an additional overpressure or excess pressure valve controlling the admission of fluid to the hydrodynamic clutch and to the lubricating points; and I, II, III and IV denote the hydraulic rams for actuation of the clutches for the first, second, third and fourth speed, the pistons of which are denoted by the reference numerals 74, 57, 56 and 30 in my co-pending application.

The hydraulic system includes a number of exhaust or discharge conduits serving to discharge the pressure fluid into the sump of the transmission. All of such discharge conduits have been denoted by 0. They are under atmospheric pressure.

The transmission is the same as that disclosed in the co-pending application, the clutch of the first and lowest speed being a toothed clutch which drives the associated gear through a one-way clutch and, therefore, can remain in engaged condition when the friction clutch for the second speed is engaged. The transmission is shifted to the second speed, the third speed and the fourth speed by the individual actuation of friction clutches, preferably of the multi-disk type. Power is transmitted from the engine to the transmission in the first, second or third speed condition thereof by a hydrohynamic clutch. In the fourth speed condition, i. e. in direct gear, such fluid transmission is disabled by a friction clutch connecting the sections of the hydrodynamic clutch to one another for common rotation.

The shifting valve U is a piston slide valve having the piston sections 10, 11, 12 and 13 separated by recessed sections of reduced diameter and is movable within a cylindrical bore having a length exceeding that of the shifting valve thus providing for the end spaces 14 and 22. The bore is provided with a plurality of peripheral grooves 15, 16, 17, 18, 19, 20 and 21, each being provided with a port communicating with a suitable duct to be described later. The end space 14 and the groove 16 are connected by such ducts 107 to the secondary pump P2. The groove 18 is connected by the associated duct 108 to the primary pump P1. The grooves 15 and 19 are connected by the associated ducts 109, and 106 respectively, to exhaust indicated by the reference character 0, thus being maintained under atmospheric pressure. A spring 23 encased in space 22 tends to urge slide valve U to the left with reference to Fig. 1. In the position of the valve shown in Fig. 1 groove 17 communicates with groove 18 and is thus connected with the primary pump P1. However, when the valve is shifted to the right contrary to the tendency of spring 23 under the effect of pressure in space 14 produced by the pump P2, the piston section 11 will be positioned between the grooves 17 and 18 whereby groove 17 will be cut off from pump P1 and will be connected to pump P2. Groove 17 is connected by its associated conduit, a conduit 26 and a conduit 24 to a groove 53 of a bore accommodating the pressure control valve D. A branch 110 of conduit 24 leads to the end space 41 of such bore. From the space 41 a duct 25 leads to the end space 22 coordinated to shifting valve U. Duct 24 has a branch 27 leading to a groove 111 of a cylindrical bore 67 accommodating the plane shifting valve. The conduit 26 leads to a groove 112 of a bore 92 accommodating the reverse valve R*h*.

It will be recalled that the plane shifting valve G*s* is so connected to the gear shift lever mounted on the steering column of the vehicle that it assumes the position shown when the gear shift lever is in its upper plane being set to first, second, third or fourth speed assuming any one of the positions indicated in Fig. 2 by the Roman numerals. It will be moved to the left when the gear shift lever is set to any one of its positions V, L, R.

In the position shown, the valve G*s* establishes communication of conduit 27 terminating in groove 111 with a conduit 28 connected by duct 113 to groove 114 of the bore accommodating valve G*s*. Conduit 28 connects a groove 29 of the bore accommodating the ratio selector valve W to a conduit 54 which will be described later. The ratio selector valve W is so connected to the gear shift lever as to be brought to any one of four positions by adjustment of the gear shift lever to any one of the positions I, II, III or IV indicated in Fig. 2. A spring-controlled detent 35 mounted in the valve housing and engaging one of the four grooves I', II', III' and IV' serves to resiliently detain the ratio selector valve W and the gear shift lever in their set position. At its left end the valve W is provided with a piston portion 34 adapted to assume a position between any one of five grooves 29, 30, 31, 32, 33 and 115 which are provided in the bore of the valve housing accommodating valve W. In the position shown in which the gear shift lever and valve W are set to the third speed, the detent 35 engages groove III'. Groove 30 is connected by a line 36 with the end space 37 of a bore accommodating the gear shift control valve SII and an auxiliary slide valve 84 to be referred to later. Valve SII serves the purpose of connecting the ram II which when actuated sets the transmission to second speed, either to exhaust or to the source of pressure P1 or P2. Groove 31 associated with the ratio selector valve W is connected by a duct 38 with the right hand end space 39 of another cylindrical bore of the valve housing accommodating a gear shift control valve SIII which serves the purpose of controlling the ram III which when actuated will set the transmission to third speed. A branch 116 leads from duct 38 to a groove 102 of the cylindrical bore accommodating the auxiliary valve 84 above referred to.

The groove 32 associated with the ratio selector valve W is connected by a duct 40 to a groove 21 associated to the shifting valve U. In the position shown, groove 21 is sealed by the piston section 13 thereof.

The bore accommodating the pressure control valve D is provided with the internal peripheral groove 42, 43, 44 and 45 which cooperate with edges 46, 47, 48 and 49 of spaced piston sections of the valve member D. It will be noted from Fig. 1 that the edges 46, 47 and 48 are spaced apart larger distances than the cooperating left hand edges of the groove 42, 43 and 44. Also the left-hand edges 48, 49 are spaced apart a much smaller distance than the left hand edges of the groove 44 and 45. In the position shown, the left hand edge of groove 45 registers with the edge 49 of the valve member whereby groove 45 is sealed. When the valve D moves left from the position shown, the edges 46, 47 and 48 will engage the cooperating edges of grooves 42, 43 and 44 in timed succession. This is an important feature of my invention as will appear from a detailed explanation of the function hereinafter. The grooves 42 and 44 are connected to one another and duct 54 by a conduit 117. As stated above, the groove 53 is connected to the duct 24 and the end space 41 is connected with the duct 24 by a conduit 110. A throttle 50 is inserted in the latter having the function of counteracting oscillations of the valve member D.

Pressure control valve D has a stem 118 which extends out of the valve housing and is subjected to the influence of a compression spring 55 mounted between washers 119 and 121 slidably guided between suitable guiding means 120 attached to the valve housing. A suitable abutment diagrammatically indicated at 122 is provided to adjust the position of washer 121 whereby spring 55 may be biased to any desired degree.

A groove provided in the stem 118 is engaged by one arm of a bell crank 58 which is mounted on an eccentric portion 123 of a shaft 57 rotatably journalled in suitable brackets mounted on the valve housing, such brackets being diagrammatically indicated at 124. Means are provided to arrest shaft 57 in any adjusted angular position. For that purpose, a lever 157 is rigidly secured to the shaft 57 which includes a tightening screw 158 which extends through a slit 159 in a part 160 which is fastened to the stationary part of the transmission. The lever arm 157 may thus be fastened in any desired position by means of the screw 158 engaging the slit 159. The other arm of the bell crank 58 engages the central abutment of a diaphragm M which terminates or seals a cavity 61 provided in the valve housing, such cavity communicating by duct 125 with the intake manifold 126 of the engine diagrammatically shown at 127. The diaphragm is resiliently kept in engagement with the bell crank 58 by the effect of a compression spring 60 inserted between the diaphragm and an adjustable supporting plate 128 which is carried by an adjustable threaded spindle 59 journalled in the wall of the cavity 61.

A peripheral recess 51 of valve member D is permanently in registry with a port provided in the wall of the cylindrical bore accommodating valve D, and this port communicates with a duct 62 serving to supply fluid under pressure to ram I or to ram IV in the manner to be described later. Similarly, another peripheral recess 52 of the valve member D is in permanent communication with a duct 63 serving to supply fluid under pressure to ram II for the second speed. Te groove 43 communicates with a duct 64 serving to supply fluid under pressure to ram III for the third speed.

The duct 62 communicates with an internal peripheral groove 65 of the bore in the valve housing accommodating gear shift control valve SIV. A branch 66 of duct 62 leads to a peripheral groove 130 of the bore accommodating the plane shifting valve Gs. With the position of the latter as shown, a circumferential groove 67 of valve member Gs establishes a communication of groove 130 with another groove 131 which is connected by line 68 to ram I which when actuated alone, each of the rams II, III and IV being put on discharge, will set the transmission to first speed.

The gear shift control valve SIV is shown as assuming its right hand end position in which it is kept by a compression spring 69 inserted in the left hand end space 132 of the bore accommodating valve SIV, such end space being connected by line 133 to discharge. The right hand end space 70 communicates via duct 71 with grooves 20 coordinated to shifting valve U. A circumferential recess 72 of valve member SIV is in permanent communication with a conduit 73 which leads to the ram IV and contains a throttle 134. A branch 76 of line 73 is connected by a passage 74 with the left end space 75 of the bore accommodating gear shift control valve SIII. The branch conduit 76 leads to an internal peripheral groove 104 of the bore 77 accommodating the auxiliary valve 84 and, in the position shown, registers with a port 135 provided in the wall of the cup-shaped valve member 84. The width of port 135 slightly exceeds the distance of the grooves 102 and 104 for a purpose to be explained later.

The gear shift control valve member SIII is subject to the force of a compression spring 75 inserted in the left end space of the bore accommodating valve member SIII and tending to shift valve member SIII from the position shown to its right hand end position. In the position shown, a circumferential recess 136 of valve member SIII which is in permanent communication with a duct 80 leading to ram III registers with peripheral groove 79 of the bore, but is out of registry with a groove 90 spaced therefrom. Therefore, duct 64 communicating with groove 79 is put in communication with duct 80 in which preferably an adjustable throttle 137 is provided. A branch 81 of duct 80 leads to an enlarged section 82 of the bore accommodating valve SII. The cup-shaped auxiliary valve member 84 encases a pressure spring 105 which engages the end wall of the bore tending to urge the auxiliary valve member 84 towards the right contrary to the tendency of a helical spring 85 which is inserted between valve members SII and the auxiliary valve member 84. Both valve members are provided with opposed stems 138 and 139 which, in the position shown, are spaced from one another. As a result, the valve member SII is influenced by the pressure of spring 85 which depends on the position of the auxiliary valve 84. The latter may compress spring 85 acting as a piston and moving under the effect of fluid under pressure admitted through port 135 to the space 77, such pressure being assisted by spring 105. Moreover, valve SII is subject to the pressure existing in the end space 37. The spring 85 is considerably stronger than spring 105.

The line 63 leads to a peripheral groove 86 which, in the position shown, is sealed by valve SII, but may be brought to registry with a circumferential recess 87 of the valve member SII when the same moves to the left from the position shown, the recess 87 communicating permanently with duct 88 leading to ram II which when actuated will set the transmission to second speed. An adjustable throttle 140 is preferably inserted in conduit 88. In the position shown, the recess 87 also registers with an internal peripheral groove 89 of the bore connected to a line 141 that leads to the internal peripheral groove 90 cooperating with valve member SIII. A branch 91 of line 141 leads to a port in the bore accommodating reverse valve Rh and is in permanent communication with a circumferential recess 92 of the valve member Rh. When the reverse valve assumes the position shown which it does when the gear shift lever is in any one of the positions I, II, III, IV, V, L, the recess 92 registers with a peripheral groove 142 connected to a discharge line 143. Hence, ram II is put on discharge through 88, 87, 89, 141, 91, 92, 142, 143.

A conduit 93 connects the groove 45 cooperating with the pressure control valve member D with a cylindrical bore provided in the valve housing to accommodate the over-pressure valve member V. This valve member is acted upon by a compression spring 94 inserted in said bore and, in the position shown, is kept by such spring in contact with an abutment 101 constituted by a pin projecting into the bore at a certain distance from the right hand end face thereof. The end space surrounding the abutment 101 communicates with the conduit 93 and the latter is connected by a branch 96 with the hydrodynamic fluid clutch K diagrammatically indicated in Fig. 1 by a circle. The bore accommodating valve member V is further provided with two spaced peripheral grooves 97 and 100. Groove 97 is connected by a conduit 98 to the various lubricating points of the transmission diagrammatically indicated by a circle Sch. The valve member V is cup-shaped, its interior communicating with the space 95, and has an external circumferential groove 143 communicating with the interior of the valve member by radial holes 99. The admission of fluid under pressure from groove 45 controlled by valve D through conduit 93 to space 95 causing the valve member V to move to the left contrary to the tendency of spring 94 will bring the recess 143 into registry with the groove 97, whereby lubricating fluid will be admitted to the points Sch via 45, 93, 95, 99, 143, 97, and 98. When the fluid pressure in space 95 tends to rise above the permissible limit, valve member V will be moved to the left to such an extent as to uncover groove 100 which is put on discharge by line 144 thus relieving the pressure and limiting it to a certain amount.

The operation of the described control system is as follows: In Fig. 1 the parts assume the position in which the gear shift lever has been shifted to position III (Fig. 2), and in which the vehicle is runnng at such a low speed that the pressure produced by pump P1 outweighs the pressure produced by pump P2. The plane shifting valve Gs and the ratio selector valve W being both controlled by the gear shift lever assume the positions shown. The gear shift lever has been brought to the #III position from the #II position. In the position #II the detent member 35 engages the groove II′ of the valve member W.

The same position II′ is assumed by valve member W when the gear shift lever is set to the L position for idling, but in that event the plane shifting valve Gs assumes its other end position left of that shown in Fig. 1. In such left position of plane shifting valve Gs corresponding to the L position of the gear shift lever the circumferential recess 67 of the valve member Gs is in registry at the same time with groove 131 connected to line 68 and with groove 145 connected to discharge. Another circumferential recess 146 of valve member Gs is simultaneously in registry with groove 114 connected to line 113 and with a groove 147 put on discharge. Therefore, the conduit 68 leading from groove 131 to ram I adapted to set the transmission to first speed and the conduit 54 leading to the pressure control valve D and via line 28 to the ratio selector valve W are thus put on discharge. The idling condition so produced will now be described.

In that condition each of the rams I, II, III and IV is under atmospheric pressure and all of the friction clutches controlled by such rams are disengaged. The fluid fed by the primary pump P1 is admitted via grooves 18 and 17 and conduits 26, 24 and 110 to the end space 41 moving valve member D all the way to the right beyond the position shown. Thus, fluid will be admitted from conduit 24 through groove 53 past edge 49 via groove 45, line 93 and line 96 to the hydrodynamic clutch. The fluid under pressure will enter end space 95 and will shift valve V to the left to bring its recess 143 to registry with groove 97, whereby the fluid will be admitted from 95 through holes 99 to groove 97 and thence through line 98 to the lubricating points Sch. Any surplus of the fluid fed which will not be taken up by either line 96 or line 98 will cause further movement of valve member V to the left until the latter uncovers the peripheral groove 100 which is put on discharge thus discharging the surplus of oil. From the foregoing it will appear that when the engine is idling, the pump P1 serves the sole purpose of feeding oil to the clutch K and to the lubricating points Sch.

When the driver wishes to start the car, he will move the gear shift lever from its L position to the #II position and open the engine throttle 148. While that operation will leave the ratio selector valve W in the position II' in which the piston portion 34 thereof interrupts communication of groove 31 with groove 29 and the line 28 connected thereto, it will shift the plane shifting valve Gs to the right into the position illustrated cutting off lines 113, 28 and 54 from the discharge groove 147 and connecting them to groove 111 supplied with fluid under pressure through lines 26, 27.

Let us assume that the vehicle is driving at such a low speed that the spring 23 and the pressure produced by the primary pump P1 in the space 22 overcomes the pressure produced by the secondary pump P2 in the end space 14 thus holding the shifting valve U in the position shown in which the primary pump P1 supplies pressure to lines 26, 24 and 25. The compression spring 55 acting on valve member D and on the fluid in the end space 41 will so control the diacharge past the edge 49 via 45, 93, 95 and 100 as to maintain a predetermined pressure in the space 41 and the lines 24 and 25 communicating therewith. This will be true even if the throttle 148 should be fully closed maintaining a high vacuum within the cavity 61 causing the diaphragm M to relieve the bell crank 58 from the pressure of spring 60.

The movement of the plane shifting valve Gs from its left end position to the position shown had not only the effect of supplying fluid under pressure to line 28, but had also the effect of disconnecting groove 131 and line 68 from the discharge groove 145 and connecting it to groove 130 and line 66 for a purpose to be described later.

Fluid under pressure will be supplied from pump P1 via 108, 18, 17, 26, 27, 111, 146, 113, 28 and 29 to the groove 30 and thence via line 36 to the end space 37 of the bore accommodating valve SII moving same to the left until its circumferential recess 87 registers with groove 86.

Movement of valve member SII to the left from the position shown at this stage is rendered possible by the fact that the fluid otherwise entrapped in space 85 will be discharged via lines 81 and 80, circumferential recess 136, groove 90 (with which recess 136 registers at this time, with gear shift lever in position II, as will be explained later), line 141, duct 91, recess 92, groove 142, and discharge line 143.

The sudden discharge of the fluid on this course into space 37 produces an immediate drop of the pressure existing in the end space 41 thus permitting springs 55 and 60 to move valve member D to the left until it seals groove 45, circumferential recess 51, recess 52, and groove 43 thus disconnecting lines 93, 62, 63 and 64 from the bore accommodating valve D. However, since pump P1 keeps running, it will gradually make up for the loss of oil suddenly escaped into space 37 and will raise the pressure whereby valve D will successively re-open the interrupted connections. When recess 52 is re-opened by the controlling edge 48, fluid under pressure is admitted from line 24 via groove 53, recess 44, recess 52, line 63, groove 86, recess 87 and line 88 to ram II thus engaging the clutch for the second speed. As a result, the car will start in second speed. As its speed increases the pressure produced by the secondary pump P2 will rise. Since the discharge of this pump through groove 16, groove 15 and line 109 is throttled by the throttle 103, the pressure transmission through branch line 107 to end space 14 will eventually overcome the combined fluid pressure in the end space 22 and the pressure of compression spring 23 shifting valve U to the right. As a result, pump P1 will be disconnected by piston section 11 of the valve member from groove 17 and will be connected by the circumferential recess located between the piston sections 11 and 12 with groove 19 put on discharge through line 106. At the same time piston section 10 will seal the discharge groove 15, and the peripheral recess of the valve member located between the piston sections 10 and 11 will establish communication between pump P2 and groove 17 and the system of pressure lines 26, 27, 24, 25 connected thereto. Thus, the end space 22 will now be supplied with fluid under pressure by pump P2 in lieu of pump P1. The sealing of the throttle discharge line 109 by piston section 10 has the effect of preventing a return movement of the shifting valve U from its right hand position to the position shown until the pressure in end space 14 has dropped to a lower limit than that which has urged the shifting valve to the right from the position shown. In this manner, an undesirable agitation or actuation of the shifting valve U will be prevented which might occur in the absence of throttle 103 when the vehicle is operated at a critical speed at which the valve U is shifted from the position shown in Fig. 1 to the right.

The fluid passing from groove 16 to groove 17 will be throttled by the left edge of piston member 11 causing a drop of pressure depending on the fluid current. Owing to such drop of pressure there will exist equilibrium between the pressure acting on valve member U in the end space 14 in one direction and the pressure acting on the valve member U in end space 22 in the other direction assisted by pressure of spring 23. However, should the fluid current be suddenly reduced, for instance owing to a sudden opening of engine throttle 148 reducing the vacuum in cavity 61 and permitting spring 60 to shift valve member D to the left cutting off line 93, the pressure in space 22 will increase and thus increase the throttling effect by piston member 11. Under certain circumstances shifting valve U may even return to the position shown. Thus, such return does not only depend on the speed of the vehicle which is proportional to the speed of pump P2, but will also depend on the vacuum existing in cavity 61 substantially proportional to the driving torque of the engine. The larger such driving torque will be, the higher will be the critical speed limit at which the shifting member U is returned to the position shown.

It does not make any difference for the actuation of ram II whether the fluid under pressure for such actuation is delivered by the primary pump P1 or by the secondary pump P2.

When the driver opens the engine throttle 148, the vacuum existing in cavity 61 will be reduced increasing the pressure exerted on valve member D by spring 60 and bell crank 58, whereby the throttling effect exerted by edge 49 of valve member D on the fluid current will be increased thereby increasing the pressure in the line system 26, 24, 25, 27 transferred to the ram II as above described. Therefore, the engaging force exerted on the friction clutch for the second speed will be increased approximately in proportion to an increase of the torque produced by the engine and transferred by the clutch to the driven shaft of the transmission. By angular adjustment of shaft 57 the relationship of the fluid pressure to the vacuum in the intake manifold 126 may be so elected as to result in the best operation, for instance in such a manner that the fluid pressure amounts to the degree required to prevent slippage of the friction clutch plus an additional safety amount of about 1.5 kilograms per square centimeter. Any influence which the number of rotations may have can be taken care of by choosing appropriate dimensions for the cross section of the fluid current supplied by pumps P1 and P2.

With ratio selector valve W in the #II position in which the detent 35 engages groove II', the piston section 34 permits groove 31 to freely communicate with groove 115 put on discharge. Therefore, end space 39 coordinated to gear shift control valve III is likewise connected to discharge permitting spring 75 to move valve member SIII all the way to the right, whereby line 80 leading to ram III will be separated or disconnected from the pressure line 64 and connected to groove 90, line 141, line 91, circumferential recess 92 of valve member Rh and groove 142 connected by line 143 to discharge.

Ram I, however, will be supplied with fluid under pressure via 24, 111, 146, 113, 54, 117, 42, 62, 66, 130, 67, 131, and 68. Ram IV is put on discharge by valve SIV in the position shown via line 73, throttle 134, circumferential recess 72 of valve member SIV, and discharge line 149. Thus, with ratio selector valve W in the #II position, the rams I and II will be supplied with fluid under pressure, while the rams III and IV are put on exhaust in compliance with the requirements explained in the above cited co-pending application.

When the driver wishes to shift the transmission to third speed, he must set the gear shift lever to its #III position shown in Fig. 2 thus moving the ratio selector valve W to the position III', as shown in Fig. 1. As a result, groove 31, line 38 and end space 39 of valve SIII will be disconnected from the discharge groove 115 by piston 34 and will now communicate with the pressure line 28 thus admitting fluid under pressure to the end space 39, whereby valve member SIII will be shifted to the position shown contrary to the tendency of spring 75. This has the effect of disconnecting ram III and line 80 from the groove 90 (which is put on discharge via 141, 91, 92, 142, 143) and of connecting them to line 64 which is supplied with fluid under pressure from pressure line 26 via 27, 111, 146, 113, 54, 117, 42, 43 causing actuation of ram III.

In order to secure a soft transition from the second speed condition to the third speed condition of the transmission, the actuation of ram III commences before ram II is put on discharge. Only when ram III will have been filled up by the fluid will the pressure existing in lines 80 and 81 communicating therewith rise to such an extent as to approach the pressure existing in space 37 thereby permitting spring 85 to shift the gear shift control valve SII to the position shown cutting off ram II, line 88 and recess 87 from groove 86 and connecting them with ducts 141 and 91, recess 92, groove 142 and the discharge line 143.

Now rams I and III are actuated, while ram II and IV are put on exhaust.

During the shifting operation the pressure control valve D permits so much fluid to be fed to the newly selected ram only that the pressure in the ram previously selected and still being actuated is maintained substantially constant. Not until the newly elected ram will have been fully actuated will line 93 be connected by edge 49 to line 24 again. Line 62 which, as explanied hereinabove, supplies fluid under pressure to ram I and, as will be explained later, serves also to supply fluid under pressure to ram IV is likewise kept under pressure in this phase of the operation.

When the driver wishes to shift the transmission to fourth speed, he must set the gear shift lever to the position #IV shown in Fig. 2, whereby valve W will be moved all the way to the left causing detent 35 to engage groove IV'. As explained hereinafter, this will cause ram III to be put on discharge and ram IV to be put under pressure.

Since piston section 34 of valve W will now be placed left of groove 32, the latter will be put in communication with groove 29 and the fluid under pressure will be admitted from pressure line 28 via 29, 32 and 40 to 21. This will have no effect as long as the vehicle is running so slowly as to keep pump P2 on discharge. However, when pump P2 is feeding the system keeping shifting valve U in its right hand position, groove 21 will be put by the circumferential recess of valve member U located between the piston sections 12 and 13 in communication with groove 20 whence the pressure oil flows through line 71 to the end space 70 of the bore accommodating valve member SIV. Since the space 132 is put on exhaust through line 133, the valve member SIV will now be moved to the left thereby disconnecting line 73 leading to ram IV from the discharge line 149 and connecting it via recess 72 to groove 65 to which pressure fluid is supplied via line 62. As a result, ram IV will be actuated. The throttle 134 retards the flow of pressure fluid to the ram causing the friction clutch actuated by ram IV to be gradually put in engagement. When the pressure in ram IV approaches its upper limit, the pressure existing therein will be transferred through ducts 73, 76 and 74 to space 75 coordinated to valve SIII and will be further transferred through duct 76, groove 104 and port 135 to the end space 77 coordinated to the auxiliary valve 84. As a result, valve member SIII will move to the right disconnecting ram III, line 80 and recess 136 from the pressure line 64 and connecting them to the discharge line extending via 90, 141, 91, 92, 142 and 143. Hence, the friction clutch for the third speed will be disengaged just after the friction clutch for the fourth gear will have been engaged. The auxiliary valve member 84 moves to the right until port 135 gets out of registry with groove 104 and establishes communication with groove 102 which is likewise under pressure at this time via 116, 38, 31, 29, 28. Therefore, the auxiliary valve member 84 will keep moving to the right until its stem 138 engages stem 139 holding valve member SII in the position shown in which ram II is on discharge. This arrangement has been provided to keep valve member SII in the position shown, even though the pressure in line 74 drops temporarily owing to the discharge of the fluid into ram IV, and even though the pressure in line 81 drops by connection of ram III to exhaust.

The differential spacing of the controlling edges 49, 46, 47 and 48 from the cooperating edges of the grooves described hereinabove has the effect that whenever a new ram is selected and is connected with the pressure line, such connection will be throttled by the associated edge 46, 47 or 48 thus preventing the pressure from dropping to an extent which would affect the previously selected ram that is still being actuated. In other words, the oil pressure will remain more or less constant when the individual clutches are actuated, the newly elected ram receiving so much fluid only as can be allotted from the fluid quantity fed by the pump without unduly reducing the oil pressure. In this manner, valve D maintains the pressure during the shifting operation.

When the driver wishes to set the transmission to first speed, he must shift the gear shift lever to the position #I shown in Fig. 2. By doing so he will set the ratio selector valve member W to the utter right hand position in which the detent 35 engages groove I' and in which each of the lines 36, 38 and 40 communicates with the discharge groove 115. As a result, the valve member SII will move to the right hand position shown and ram II will be connected to discharge. Since rams III and IV are likewise on discharge, fluid under pressure will be supplied to ram I only via 26, 27, 111, 146, 114, 113, 54, 117, 42, 62, 66, 130, 67, 131 and 68.

Since ram I is thus supplied through the same duct 62 as ram IV, the pressure control valve D will not open line 62 until lines 63 and 64 for ram II and ram III have been put on pressure. In this manner, the requirements will be complied which arise when the driver moves the gear shift lever from L via II directly to I thus temporarily putting ram II under pressure. In this event, valve D will seal the recess 51 and line 62 supplying ram I until ram II has been actuated. The transitional and temporary actuation of ram II is necessary in order to synchronize the toothed sections of the clutch for the first speed, as explained in my co-pending application above referred to.

The pressure fluid actuating valves SII, SIII and SIV is controlled by the valves Gs and W and is derived via 26, 27, 111, 146, 114, 113, 28 and is thus maintained by valve D substantially constant and unaffected by the sudden pressure fluid demand arising by selection of any of the rams. Therefore, such sudden fluid demand of a ram and the consequent drop of pressure in the system directly connected with such rams including lines 62, 63 and 64 cannot cause the inadvertent and accidental actuation of any of the valves SII, SIII and SIV.

The reverse valve Rh which, as described in the co-pending application, is shifted from the right hand position shown in Fig. 1 to its left hand position when the driver moves the gear shift lever to its R position shown in Fig. 2, is connected in shunt with the pressure control valve D and the valves SII and SIII. Thus, the rams for the second and third speed will be actuated either under control by the pressure control valve D or under control by the reverse valve Rh when the latter is moved to its left position. By such setting the valve Rh will disconnect line 91 from the groove 142 and the discharge line 143 and will connect line 91 to the pressure line 26. By the means described in the above cited co-pending application, the valve member W is locked in its #II position. Therefore, end space 39 is put on exhaust via 38, 31, 32, and 115 causing spring 78 to move valve member SIII to the right thus establishing communication between groove 90 and recess 136 permitting fluid under pressure to flow from 91 via 141, groove 90, recesses 136 and 80 to ram III. At the same time, end space 37 is also put on exhaust via line 36, grooves 30 and 29, lines 28 and 113, grooves 114 and 147, since the plane shifting valve Gs is also moved toward the left with movement of gear shift lever into position L, R or V, so that fluid under pressure may flow from 91 via 141, 89, 87 and 88 to ram II. The simultaneous engagement of both rams II and III will bring the gears of the transmission to a stop thus facilitating the mechanical engagement of the teeth of the gears actuated by the gear shift lever moving from the L position to the R position.

As a matter of principle, the system described is so devised that the pressure oil controlled by the pressure control valve D must flow through valves SII, SIII and SIV only in order to reach the rams, whereby leakage losses will be minimized and whereby the ducts may be made comparatively short.

Preferably, the spring 94 is so dimensioned or adjusted that the maximum pressure maintained thereby in space 95 and line 93 causing valve member V to uncover groove 100 is insufficient, if effective in the rams I, II, III and IV, to cause engagement of the transmission clutches. If the engine throttle is fully closed and if thereby a maximum vacuum in the intake conduit is produced diaphragm M is retracted in the direction of spring 60 to such an extent that lever 58 is no longer touched by spring 60. The oil pressure obtained by pressure control valve D is controlled by spring 55 exclusively and does no longer depend on the pressure rate in the suction conduit. The pre-tension of spring 55 is so chosen that the oil pressure adjusted thereby is just sufficiently large enough that the friction clutches engaged by the oil pressure are able to transmit the largest towing torque of the engine caused, for example, by the resistance and friction of the engine with the vehicle pushing the engine as, for example, during a down-hill drive when torque is transmitted from the vehicle wheels to the engine.

The above will make it clear that the pressure control valve D determining the pressure of the fluid admitted to the rams I, II, III and IV (except for the reversing operation) is under the control by the vacuum in the intake manifold of the engine and participates in the control of the gear shift control valves SII, SIII and SIV which, in their turn, cooperate with the ratio selector W to control the actuation of the clutches provided in the transmission for the different ratios of transmission or speeds. In this manner, the pressure of the fluid actuating such clutches will be so controlled as to be maintained more or less in proportion to the mechanical torque to be transferred by the respective clutch. In other words, when the engine is throttled to reduce such torque, this will at the same time result in a reduction of the clutch-actuating fluid pressure.

The described spacing of the controlling valve edges 46, 47, 48 and 49 in relation to the spacing of the cooperating edges of grooves 42, 43, 44 and 45 has the effect that when a ram is being supplied with fluid under pressure for the purpose of actuating the associated clutch, the issuance of the required quantity of fluid from the system of pressure lines 24, 25, 26 and 27 will not materially affect the pressure in such system and, therefore, will not affect the operation of such ram or rams as is or are in actuated condition at the time. Hence, the period of engagement of the friction clutches may be so controlled as to overlap, the clutch for the third speed for instance being engaged at a time before the clutch for the second speed has been disengaged. In this operation the actuation of ram III will not adversely react on the pressure keeping ram II actuated.

Moreover, it will appear that the pressure actuating a ram for a certain speed, such as ram IV, will control the valve member, such as SIII, of a ram for a lower speed to prevent the inadvertent actuation of the latter, e. g. by line 76 admitting pressure to space 75 and holding SIII in the position in which it puts ram III on discharge irrespective of any drop of pressure in space 39.

The vacuum in the intake manifold of the machine will act directly on the pressure control valve D, the springs 60 and 55 being so adjusted that when the throttle 148 of the engine is fully closed, for instance when the vehicle is coasting, the power transmission from the wheels of the vehicle to the engine will be interrupted.

Owing to the direct control of pressure control valve D by the vacuum in the intake manifold, the pressure drop caused by leakage and fluid friction may be reduced to a minimum since but a single control valve, to wit SII, SIII and SIV, need be interposed between the valve D and the respective ram II, III, or IV. The gear shift control valves SII, SIII and SIV themselves are controlled by the command pressure, i. e. the pressure of the fluid fed by the primary or secondary pump P1 or P2 and controlled by a ratio selector valve W, whereby the fluid having a pressure reduced by the pressure control valve D in dependence on the engine torque will be admitted to the individual ram II, III, or IV, the admission to the ram IV for the highest speed, however, being prevented unless the system is being supplied by the secondary pump P2.

Figure 4:
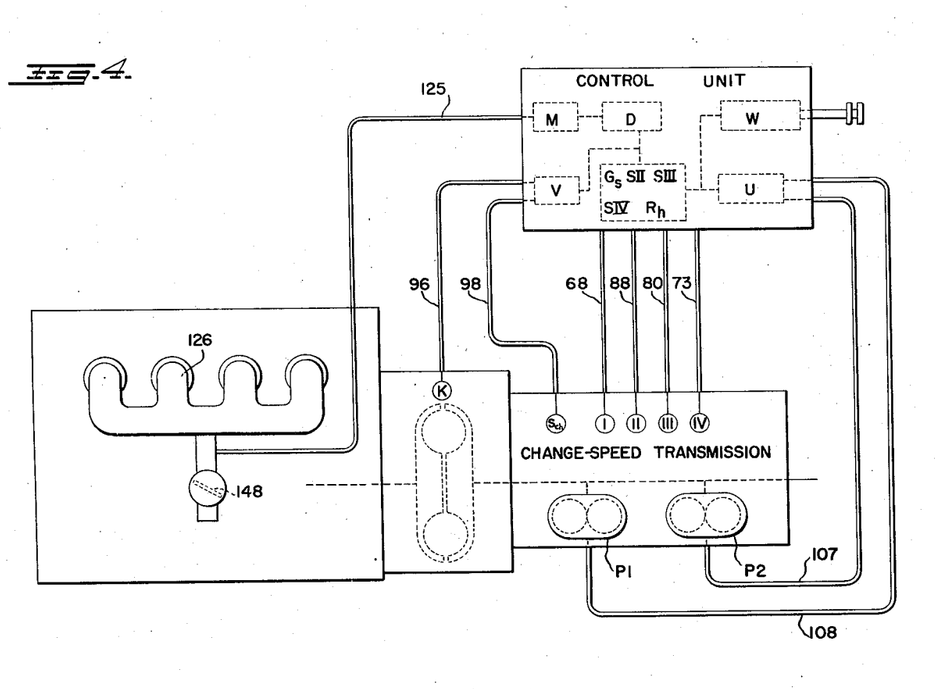
Figure 4 is a side view of an engine, hydraulic coupling and change-speed transmission according to the present invention showing schematically the overall layout in accordance with the present invention.

Figure 4 shows the general layout of a control system in accordance with the present invention, and its interconnection with the various parts of the engine, the hydraulic coupling and the change-speed transmission. While the elements M, D, W, V, U, Gs, SII, SIII, SIV and Rh have been shown in a separate control unit in Figure 4 for purposes of clarity, it is understood that all of these elements shown in the control unit may be accommodated in practice in the change-speed transmission casing itself.

While I have described my invention with reference to a preferred embodiment thereof, I wish it to be clearly understood that the invention is in no way limited to the details of such embodiment, but is capable of numerous modifications within the scope of the appended claims.

What I claim is:

1. Control system for a motor vehicle speed change transmission equipped with a plurality of fluid-operable clutches determining the ratio of transmission, comprising a fluid pump, a plurality of rams each adapted to actuate one of the clutches, conduits connecting said rams to said pump, gear shift control valves in said conduits for the selective connection of said rams to and disconnection from said pump, a pressure control valve coordinated with said pump and adapted to determine the pressure of the fluid fed thereby, said pressure control valve being formed as a slide valve and including controlled edges spaced relative to each other so as to open said conduits in succession when said pressure control valve moves in response to an increase of said pressure, said succession commencing with the conduit coordinated with the ram of a low speed and ending with the conduit coordinated with the ram of the highest speed, and an intake vacuum-controlled mechanism adapted to adjust said pressure control valve so as to reduce said pressure, as the intake vacuum of the motor vehicle engine increases.

2. Control system for a motor vehicle speed change transmission equipped with a plurality of fluid-operable clutches determining the ratio of transmission, comprising a pump, a valve casing having a bore, a pressure control valve of the slidable piston type mounted in said bore, the latter being connected to said pump so as to subject said pressure control valve to the pressure produced by said pump, an adjustable spring acting on said pressure control valve in a sense opposite to said pressure, an intake vacuum-controlled mechanism operatively connected with said control valve to exert thereon an increasingly smaller counter force against said pressure with an increase in vacuum in the intake of the engine, a plurality of rams each adapted to actuate one of the clutches, conduits connecting said rams to said pump under control by said pressure control valve, and gear shift control valves in said conduits for the selective connection of said rams to and disconnection from said pump.

3. Control system for a motor vehicle speed change transmission equipped with a plurality of fluid-operable clutches determining the ratio of transmission, comprising a pump, a valve casing having a bore, a pressure control valve of the slidable piston type mounted in said bore, the latter being connected to said pump so as to subject said pressure control valve to the pressure produced by said pump, an intake vacuum-controlled mechanism operatively connected with said control valve to exert thereon an increasingly smaller counter force against said pressure with an increase of the vacuum in the intake of the engine, a plurality of rams each adapted to actuate one of the transmission clutches, conduits connecting said rams to said pump, said pressure control valve being provided with control edges each of which controls one of said conduits, said edges being so relatively spaced as to open said conduits in succession when said pressure control valve moves in response to an increase of said vacuum, said succession commencing with the conduit coordinated to a ram of a low speed and ending with the conduit of the ram of the highest speed.

4. Control system as claimed in claim 1 in which said pressure control valve is adapted, when adjusted by said intake vacuum-controlled mechanism under the influence of the highest vacuum, to avoid a falling of the said pressure below a minimum limit so that the lowest oil pressure thus possible is always sufficient to enable the friction clutches actuated by this oil pressure to transfer the highest friction torque of the engine, caused by a pushing car.

5. Control system as claimed in claim 1 combined with manually settable means for varying the adjusting effect of said intake vacuum-controlled mechanism upon said pressure control valve.

6. Control system as claimed in claim 1 in which said intake vacuum-controlled mechanism comprises a diaphragm chamber communicating with the intake manifold of the engine, the diaphragm confining said chamber, a lever engaging both said pressure control valve and said diaphragm, a pivot carrying said lever, and manually settable means for adjusting said pivot.

7. Control system as claimed in claim 1 in which said intake vacuum-controlled mechanism comprises a diaphragm chamber communicating with the intake manifold of the engine, the diaphragm confining said chamber, a lever engaging both said pressure control valve and said diaphragm, a pivot carrying said lever, manually settable means for adjusting said pivot, and an adjustable spring acting on said diaphragm.

8. Control system for a motor vehicle speed change transmission equipped with a plurality of fluid-operable clutches determining the ratio of transmission, comprising a pump, a plurality of rams each adapted to actuate one of the clutches conduits connecting said pump to said rams, a pressure control valve of the slidable piston type having a plurality of control edges, each of said edges controlling one of said conduits, a vacuum-controlled mechanism adapted to be connected with the intake conduit of the engine and including a member adapted to actuate said pressure control valve, said control edges being so spaced as to successively close said conduits when said pressure control valve is moved by said vacuum-controlled mechanism in response to a collapse of the vacuum in the intake manifold of the engine.

9. Control system as claimed in claim 8 in which said edges are so spaced and located relative to said conduits that said succession commences with the conduit for the ram of the highest speed.

10. Control system as claimed in claim 8 in which said edges are so spaced and located relative to said conduits that said succession commences with the conduit for the ram of the highest speed, the next conduit including that of the second highest speed, progressing down the different speeds, the ram of the lowest speed, however, communicating with the conduit for the ram of the highest speed.

11. Control system for a motor vehicle speed change transmission equipped with a plurality of fluid-operable clutches determining the ratio of transmission, comprising a pump, a plurality of rams each adapted to actuate one of the transmission clutches, conduits connecting said rams to said pump, a lubricating conduit fed by said pump, gear shift control valves controlling said conduits, a slidable pressure control valve between said pump and said lubricating conduit mounted for movement under the influence of the pressure produced by said pump, a spring acting on said pressure control valve contrary to the effect of said pressure, said control valve being provided with a plurality of edges each edge controlling one of said conduits, said edges being so spaced and located relative to said conduits as to first open said lubricating conduit and as to subsequently open said first mentioned conduits in succession upon continued movement of said valve by said pressure produced by said pump.

12. Control system as claimed in claim 11 for a motor vehicle equipped with a hydrodynamic clutch interposed between the engine and the transmission, said system including a spring-controlled over-pressure valve in said lubricating conduit adapted to maintain a minimum pressure therein, and a branch conduit leading from said lubricating conduit to the hydrodynamic clutch.

13. In a control system for a speed change transmission of the fluid pressure-controlled type, the combination comprising a primary pump, a secondary pump, a pressure line, a shifting valve adapted to alternatively connect said pressure line to one or the other of said pumps and movable between a first position for connection of said primary pump to said pressure line and a second position for connection of said secondary pump to said pressure line, a spring acting on said valve tending to urge it to said first position, and means causing the pressure of said secondary pump to act on said shifting valve contrary to the tendency of said spring, whereby said secondary pump will by its pressure connect itself to said pressure line by actuation of said valve.

14. The combination claimed in claim 13 including means for causing the pressure prevailing in said pressure line to act upon said shifting valve in the same sense as said spring does.

15. In a control system for a speed change transmission of the fluid pressure-controlled type, the combination comprising a primary pump, a secondary pump, a pressure line, a shifting valve adapted to alternatively connect said pressure line to one or the other of said pumps, a plurality of rams adapted by selective actuation to set the transmission to different speeds of the outgoing shaft of the transmission, conduits connecting said rams to said pressure line, gear shift control valves controlling said conduits, and means operable by said shifting valve and adapted to disable the ram of the highest speed unless said shifting valve is in a position connecting said secondary pump to said pressure line.

16. Control system for a motor vehicle speed change transmission equipped with a plurality of fluid-operable clutches determining the ratio of transmission and with shifting means for shifting the transmission to reverse, comprising a fluid pump, a plurality of rams each adapted to actuate one of the clutches, pressure conduits connecting said rams to said pump, discharge conduits, gear shift control valves inserted in said conduits and individually coordinated to said rams, each of said valves being adapted to alternatively connect the coordinated one of said rams either to one of said pressure conduits or to one of said discharge conduits, and a valve operable by the shifting means for shifting said transmission into reverse, said last mentioned valve being adapted when in normal condition to connect said discharge conduits to exhaust, and when in operated condition to connect said discharge conduits to said pump for the simultaneous actuation of said rams.

17. Control system for a motor vehicle speed change transmission equipped with a plurality of fluid-operable clutches determining the ratio of transmission, comprising a fluid pump, a plurality of rams each adapted to actuate one of the clutches, conduits connecting said rams to said pump, gear shift control valves in said conduits for selectively connecting said rams to and disconnecting them from said pump, fluid-controlled actuating means associated with said gear shift control valves to shift same, conduits connecting said pump to said actuating means, a ratio selector valve controlling said last mentioned conduits, each of said gear shift control valves being adapted, when in the ram-connecting condition, to disable those of said fluid-controlled actuating means as are associated with the other ones of said gear shift control valves.

18. Control system as claimed in claim 17, comprising in addition an auxiliary slide valve coordinated to one of said gear shift control valves associated to one of said rams which, when actuated, sets the transmission to a speed of the outgoing shaft which is at least two speeds below the highest speed, said auxiliary slide valve being adapted to lock said gear shift control valve and being subjected to the pressure of one of the rams of a higher speed and being adapted to be thereby moved to its locking position in which it locks the associated gear shift control valve in its ram-disconnecting condition.

19. Control system for a motor vehicle speed change transmission equipped with a plurality of fluid-operable clutches determining the ratio of transmission, comprising a fluid pump, a pressure controlled valve coordinated therewith and operative to respond to the pressure of the fluid supplied by said pump, an intake vacuum-controlled mechanism adapted to adjust said pressure controlled valve so as to reduce said pressure with an increase in the intake vacuum of the motor vehicle engine, a plurality of rams each adapted to actuate one of the clutches, conduits connecting said rams to said pressure controlled valve, gear shift control valves in said conduits for the selective connection of said rams to and disconnection from said pressure control valve, said pressure control valve being provided with means for closing said conduits successively while responding to a reduction of said pressure and being formed as a slide control valve including control edges spaced relative to each other so as to open said conduits in succession when said pressure control valve moves in response to an increase of said pressure, said succession commencing with the conduit coordinated with the ram of a low speed and ending with a conduit coordinated with the ram of the highest speed.

20. Control system for a variable speed transmission having a plurality of hydraulically-controlled clutches for engaging the different transmission ratios of said transmission, comprising hydraulic pressure means for supplying a pressure fluid, means connected with said hydraulic pressure means including a unitary valve control means provided with a plurality of control edges consisting of one edge each for each of said clutches for selectively and individually actuating said clutches in predetermined timed succession by movement of said unitary control means, and means connected to the intake manifold including said unitary control valve means for maintaining the pressure of said fluid essentially in proportion to the mechanical torque to be transmitted by the respective clutch engaged thereby.

21. Control system for a variable speed transmission having a plurality of hydraulically-controlled clutches for engaging the different transmission ratios of said transmission, comprising hydraulic pressure means, means connected with said hydraulic pressure means and including valve control means for selectively and individually actuating said clutches, said valve control means including means for operating said clutches in timed predetermined succession in response to variations in said pressure means, and means for temporarily and simultaneously actuating two of said clutches with the actuating means in reverse position.

22. Control system for a variable speed transmission having a plurality of hydraulically-controlled clutches for engaging the different transmission ratios of said transmission, comprising hydraulic pressure means including a pump driven by the engine and a pump driven by the vehicle, and means connected with said hydraulic pressure means and including valve control means for selectively and individually actuating said clutches, said valve control means including means for operating said clutches in timed predetermined succession in response to variations in said pressure means, said hydraulic pressure means including control means operated by the difference in pressure from said two pumps to transfer the connection of said actuating means from one of said pumps to the other pump at a pressure difference different from the necessary pressure difference for the transfer thereof from said other pump to said one pump.

23. Control system for a variable speed transmission having a plurality of hydraulically-controlled clutches for engaging the different transmission ratios of said transmission, comprising hydraulic pressure means, and means connected with said hydraulic pressure means and including valve control means for selectively and individually actuating said clutches, said valve control means including pressure-responsive means for allocating to the next clutch to be engaged only so much of the hydraulic medium as can be spared while retaining pressure of the hydraulic medium in the previously operated hydraulically controlled clutch essentially constant until sufficient pressure is built up by said hydraulic pressure means in said next clutch to enable complete engagement thereof.

24. Control system for a variable speed transmission having a plurality of transmission ratios and one hydraulically-controlled clutch for each forward speed of said transmission to individually engage each transmission ratio thereof, comprising hydraulic pressure means, and means connected with said hydraulic pressure means including slide valve control means for selectively and individually actuating said clutches, said slide valve control means including pressure responsive means responsive to the vacuum in the intake manifold and therewith proportional to the torque output from the engine for adjusting the pressure of the hydraulic medium and means operative in response to variations of pressure in said pressure means for energizing said clutches in timed predetermined succession and for maintaining the pressure determined by said torque responsive means.

25. Control system for a variable speed transmission having a plurality of transmission ratios and one hydraulically-controlled clutch for each forward speed of said transmission to individually engage each transmission ratio thereof, comprising hydraulic pressure means for supplying a pressure fluid, and means connected with said hydraulic pressure means including slide valve control means for selectively and individually actuating said clutches by said pressure fluid, said slide valve control means including means operative in response to variations of pressure in said pressure fluid for energizing said clutches in timed predetermined succession and means operatively connected with said pressure responsive means for preventing over-pressures in said system.

26. Control system for a variable speed transmission having a plurality of transmission ratios and one hydraulically-controlled clutch for each forward speed of said transmission to individually engage each transmission ratio thereof, comprising hydraulic pressure means, and means connected with said hydraulic pressure means including slide valve control means for selectively and individually actuating said clutches, said slide valve control means including means operative in response to variations of pressure in said pressure means for energizing said clutches in timed predetermined succession and for maintaining a predetermined pressure in the previously engaged clutch until the next clutch is fully engaged.

References Cited in the file of this patent

UNITED STATES PATENTS

| | | |
|---|---|---|
| 1,979,488 | Perez | Nov. 6, 1934 |
| 2,528,585 | Farkas et al. | Nov. 7, 1950 |
| 2,548,208 | Evernden | Apr. 10, 1951 |
| 2,590,232 | Chilton | Mar. 25, 1952 |
| 2,606,456 | Dodge | Aug. 12, 1952 |
| 2,630,895 | McFarland | Mar. 10, 1953 |

FOREIGN PATENTS

| | | |
|---|---|---|
| 814,704 | Germany | Nov. 12, 1951 |